Aug. 9, 1966    E. O. PETERSON ETAL    3,264,915
AUTOMATIC CUTTING MACHINE
Filed July 17, 1964    3 Sheets-Sheet 1
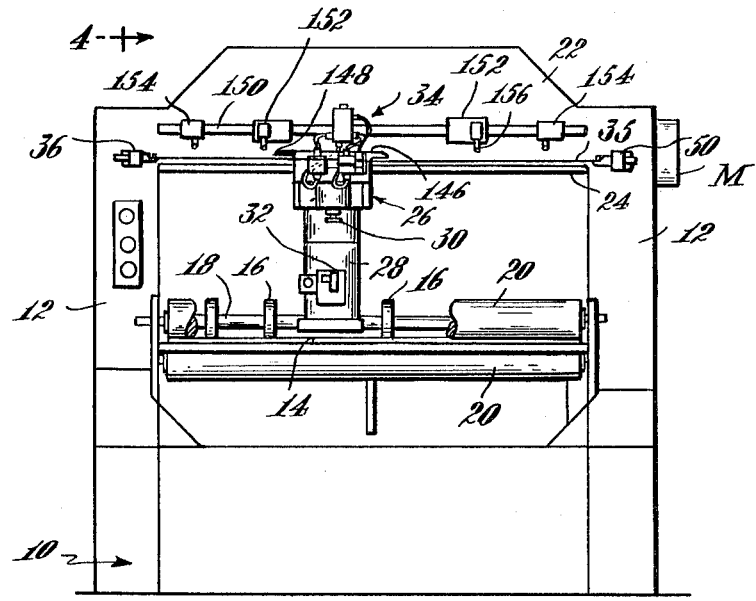
Fig. 1
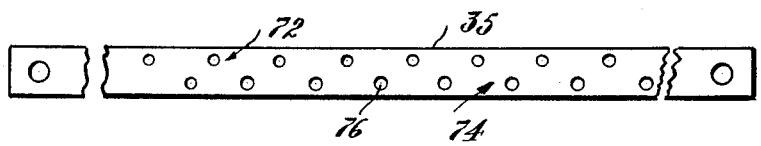
Fig. 2
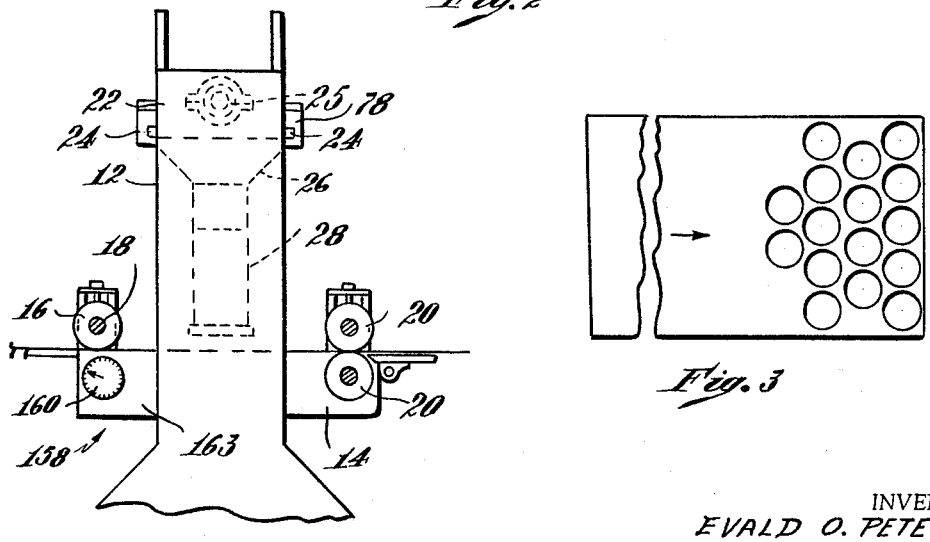
Fig. 4
Fig. 3
INVENTORS
EVALD O. PETERSON
FREDERICK A. PRAHL, JR.
JOSEPH A. VITKA, JR.
BY Roberts, Cushman & Grover
ATT'YS

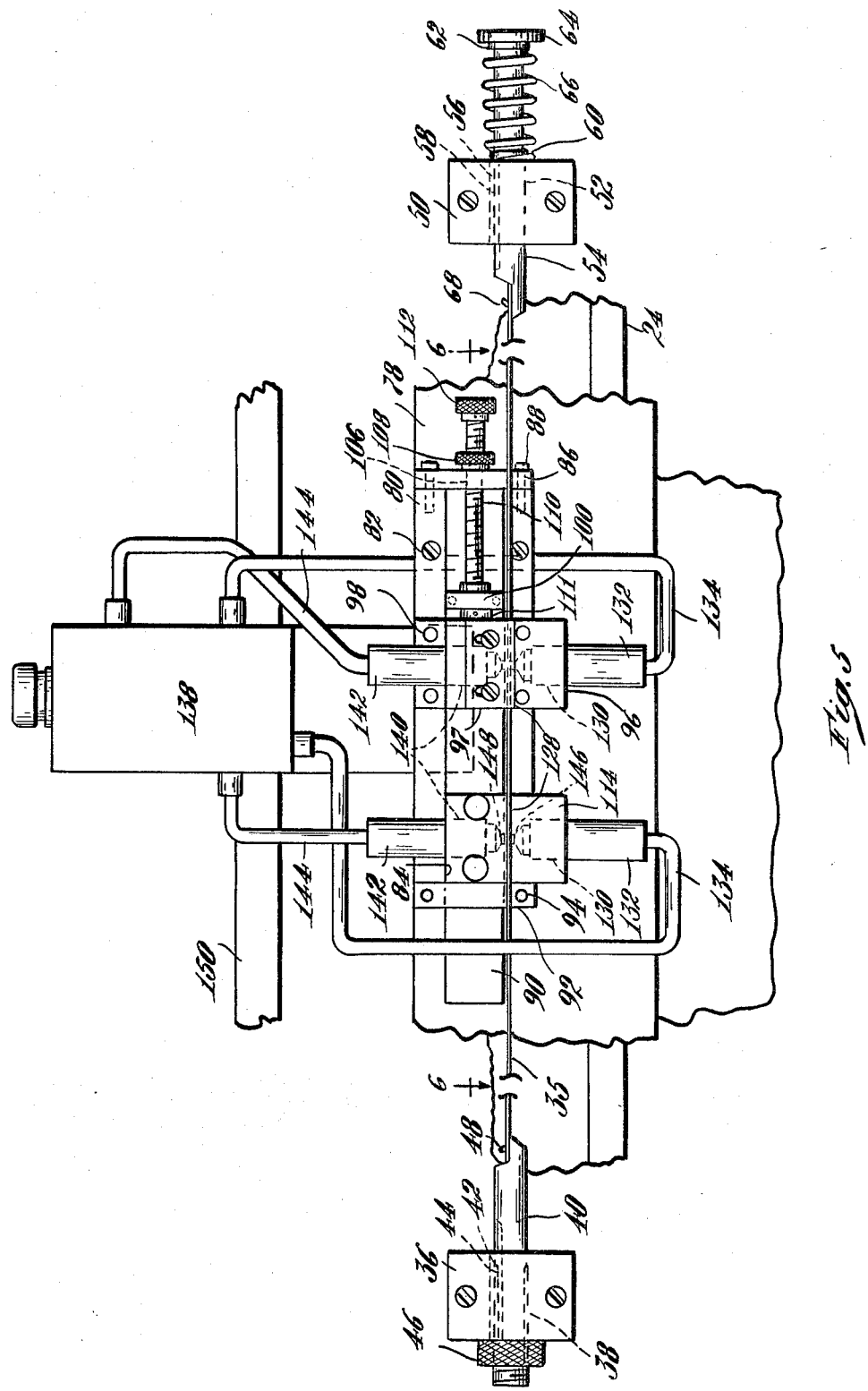

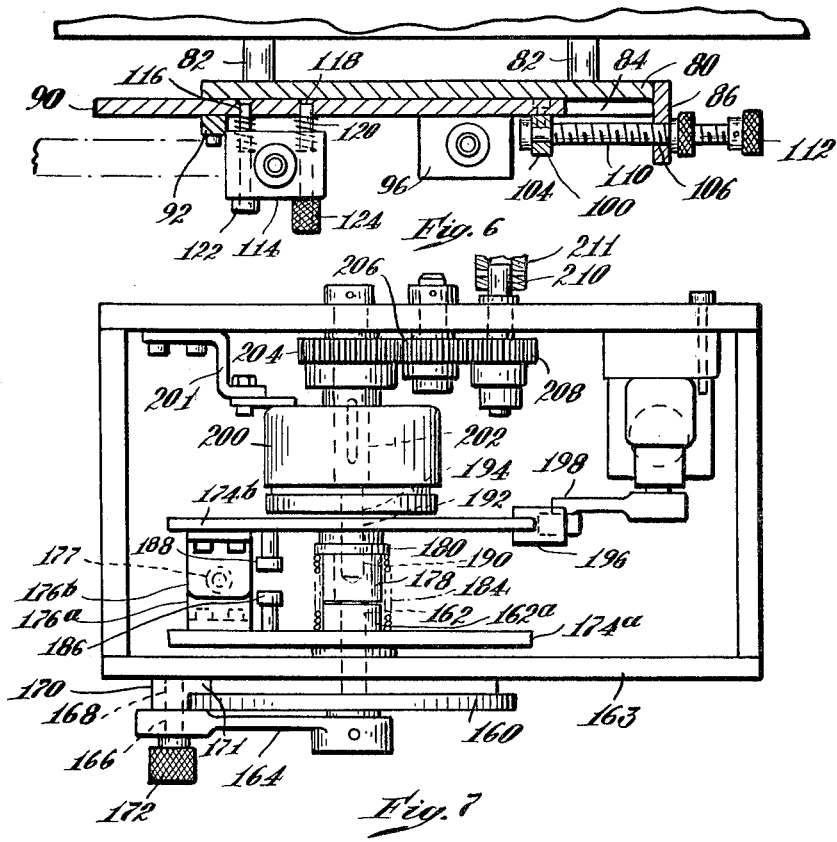
Fig. 6
Fig. 7
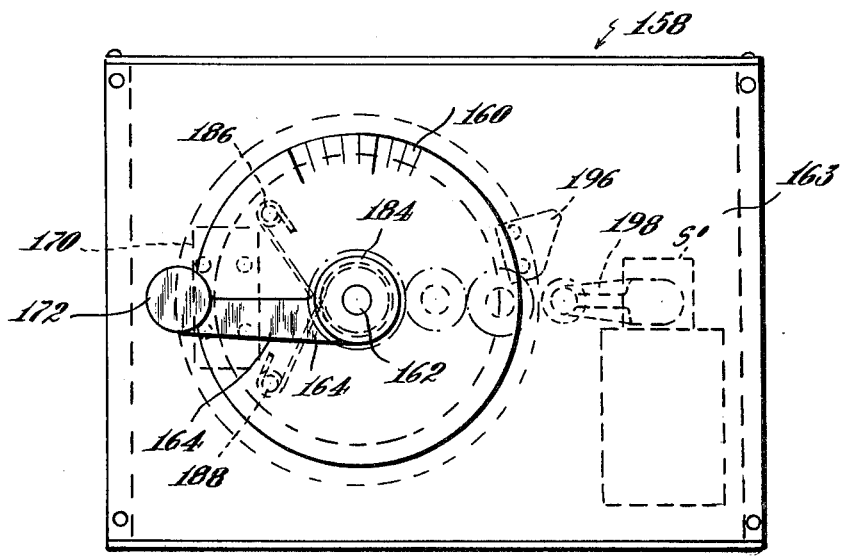
Fig. 8

3,264,915
AUTOMATIC CUTTING MACHINE

Evald O. Peterson, Lynnfield Center, Frederick A. Prahl, Jr., Harvard, and Joseph A. Vitka, Jr., Winchester, Mass., assignors to Compo Shoe Machinery Corporation, Waltham, Mass., a corporation of Delaware
Filed July 17, 1964, Ser. No. 383,378
19 Claims. (Cl. 83—71)

This invention relates to die-cutting machines and especially to machines designed to move a cutting die transversely of a platen on which sheet or web material is supported for cutting from the sheet material, pieces of predetermined size and for feeding the sheet material lengthwise relative to the cutting die to cut successive rows of pieces from the sheet material.

The principal objects of the invention are to provide an automatic control for a machine of the foregoing kind operative to control movement of the cutting die transversely of the platen in such a manner as to eliminate cumulative errors which may cause the cuts to run off the sheet at either side; to provide control means which will maintain a minimum spacing between successive cuts without overlap of cuts; to provide a control which will maintain the cuts in successive rows of cuts in alignment lengthwise of the sheet material or in a predetermined relation in successive rows; to provide a control which will enable bringing the die to a stop each time it is stopped preparatory to making a cut within the same distance regardless of the direction of movement of the die; to provide a control which enables adjustment to commence the cutting operation at the most advantageous position relative to a side of the sheet in accordance with the width of the sheet and the size and shape of the pieces being cut therefrom; to provide a control which enables die-cutting transversely of the platen in one or both directions; to provide a control which enables half-stepping of the die-cutting operations in one direction relative to the other; and to provide means for effecting automatic feeding movement of the sheet between successive traverses of the die. Other objects are to provide a control which is of simple construction, easily adjustable, reliable, embodies a high degree of accuracy, provides for automatic reverse and prevents overrun in either direction.

As herein illustrated, there is means operative to move the die transversely of the platen and means operative to arrest the aforesaid means so as to bring the die to a stop each time at precisely the same position it stopped during the preceding traverse and with precisely the same distance between successive cuts in each row of cuts. The sensing means comprises a tape containing a plurality of uniformly spaced holes disposed transversely of the platen, and a sensing device movable transversely with the die, operative in response to the holes, to render the first means inoperative each time a hole is intercepted independently of the preceding movement of the die. There is sensing means for controlling movement of the die in each direction and the sensing means are adjustable relative to each other to arrest movement of the die in either direction of movement within the same distance to achieve alignment of the cuts in successive rows. The tape is supported for adjustment transversely of the platen by means including a spring at one end and a nut at the other end, rotation of which shifts the tape bodily, thus making it possible to move the first hole in the tape relative to the side of the sheet from which cutting operations are to be commenced and to permit shifting the tape during cutting operations to compensate for waviness or wandering of the edge of the strip. A single row of holes is sufficient to effect traverse of the die across and back. However, where it is possible to achieve a more economical use of the material by half-stepping so as to displace the cuts in successive rows, two rows of holes may be employed and one of the sensing means is supported for adjustment relative to the other transversely of the tape to bring it into alignment with the second row of holes. The sensing means comprise light-sensitive assemblies including a light source and light-sensitive element disposed above and below the tape and movable with the die-cutting head relative to the tape operative, by the passage of the light through the holes in the tape, to bring the cutting head to a stop, effect the cutting operation and automatically to step the cutting head to the next cutting position. There are sequence switches at the opposite sides of the platen operable to stop traverse movement when the last cut is made and limit switches operative to prevent overrun at either side. The work is advanced across the platen automatically at each end of the traverse movement of the die-cutting head by feed rolls so that cutting continues automatically until the material is used up or is stopped by a counter, or is stopped manually. Motors provide the power for the machine and magnetic clutches and brakes drive the die-cutting head transversely of the platen and effect rotation of the feed rolls. Fluid pressure is supplied through suitably controlled valves to lower and raise the ram.

The invention will now be described in greater detail with reference to the accompanying drawings wherein:

FIG. 1 is a front elevation of the die-cutting machine;

FIG. 2 is a plan view of a section of the tape for controlling cutting;

FIG. 3 is a plan view of a portion of sheet material from which circular pieces are cut to effect economy in use of the material;

FIG. 4 is an end elevation of the machine taken on the line 4—4 of FIG. 1;

FIG. 5 is a front elevation, to much larger scale, of the control means;

FIG. 6 is a transverse section taken on the line 6—6 of FIG. 5;

FIG. 7 is a plan view of a control for feeding the work to make successive cuts transversely of the work; and FIG. 8 is an elevation of the control shown in FIG. 7.

Referring to the drawings (FIG. 1), the machine has a base 10 from the opposite end of which rise spaced parallel columns 12. A table 14, in the form of a rigid platen, is supported on the base between the columns in a horizontal position upon which work may be positioned and advanced in suitable lengths for cutting. Feeding means in the form of a plurality of spaced discs 16, fastened to a shaft 18 mounted transversely of the platen 14 and parallel to its surface, provide for advancing the work forwardly across the platen, rotation of the feeding discs being controlled as will be described hereinafter. A pair of parallel rolls 20 is mounted forwardly of the feed discs in the direction of feed, transversely of the platen and parallel thereto, to hold the material flat during cutting. The discs 16 and the lower one of the rolls 20 are driven. The upper roll 20 is idle and is easily removable to permit manual cutting.

A beam 22 is mounted transversely of the platen 14 and parallel thereto between the upper ends of the columns 12 and has on its underside spaced parallel tracks 24 (FIG. 4) on which is slidably mounted a head 26. The head 26 is thus movable lengthwise of the beam and crosswise of the platen. A ram 28 is supported by the head 26 for movement therewith and is movable relative to the head, perpendicular to the platen 14, to apply cutting pressure to a cutting die mounted at its lower end or the a die placed on the work beneath its lower end. There is means 30 for adjusting the heightwise position of the ram relative to the platen 14 and a manual control 32 operable to initiate movement of the cutting stroke of the ram so that manual operation of the machine may be had when the production requirements are not high enough for automatic operation. During such manual operation however the cutting movement is effected by hydraulic pressure as it is during automatic operation. The head is traversed by a screw 25 (FIG. 4) mounted on the beam 22. One end of the screw is connected by a magnetic clutch to a reversible motor M, the latter being mounted on the column 12 at the right side as shown in FIG. 1. The other end of the screw has connected to it a magnetic brake, the latter being mounted on the column 12 at the left side. Positive positioning of the head is insured by the magnetic brake acting upon the screw when the clutch is released. The ram embodies telescoping cylindrical parts extendable and contractible by fluid pressure supplied thereto through conduits (not shown).

The machine is designed to automatically cut single or multiple thicknesses of sheets, slabs, or rolls of material and is provided for this purpose with an automatic control 34 (FIG. 1) for controlling the movement of the head 26 crosswise of the platen 14 in steps of predetermined length as determined by the nature of the work. The control 34 comprises a tape 35 (FIG. 2) which is supported on the beam 22 transversely of the platen. One end of the tape, the left end, as shown in FIG. 5, is supported by a block 36 fastened to the column 12 at the left. The block 36 contains a horizontal hole 38 within which there is slidably mounted a bar 40 containing a slot 42 lengthwise thereof. A spline 44 is secured within the hole 38 in registration with the slot 42 to prevent rotation of the bar in the block and a knurled nut 46 is threaded onto the bar and, by rotation, is operable to effect movement of the bar lengthwise. A pin 48 is fixed to the inner end of the bar in an upright, outwardly inclined position for engagement with a hole in the tape at that end.

The opposite end of the tape is supported by a block 50 fastened to the column 12 at the right. The block 50 contains a hole 52 in which there is slidably mounted a bar 54 containing a slot 56. A spline 58, secured within the hole 52 in engagement with the slot 56, prevents rotation of the bar. A boss 60 is formed at the outer side of the block 50 and a part is fastened to the outer end of the bar which has a boss 62 corresponding in diameter to the boss 60 and a flange 64. A spring 66 is mounted under compression between the block 50 and the flange 64 with its ends supported on the bosses 60 and 62. A pin 68 is secured to the inner end of the bar in an upright, outwardly inclined poistion for engagement with a hole in the tape at that end.

The tape 35 which controls stepping of the head is in the form of a flat strip of metal (FIG. 2) having a hole in each end for receiving the pins 48 and 68, and lengthwise thereof one or more rows 72, 74 of holes 76 perpendicular to its surface. The holes 76 are spaced uniformly according to the character of the work. While a single row of holes is sufficient to traverse the head in both directions, two rows 72 and 74 may be employed as illustrated in FIG. 2, in which the holes in one row are offset with respect to the holes in the other row, so as to provide for nesting of cuts to economize in the use of material as shown in FIG. 3. The tape 35 supported in this fashion is held taut between the blocks 36 and 50 by the spring 66 and is movable bodily in a longitudinal direction relative to the platen by rotation of the nut 46. Shifting the tape lengthwise provides for a convenient fine adjustment of the tape relative to the left side of the work and thus enables starting a row of cuts at a position to obtain a maximum number of pieces crosswise of the work. The tape is also adjustable while the machine is running and thus has the additional important advantage that the operator may, by the simple expedient of rotating the nut 46, shift the entire row relative to the edge of the work to compensate for waviness or wandering of the edge and thus to prevent cuts intersecting the edge and imperfect pieces.

The automatic control 34 includes sensing means mounted on the head 26 for movement therewith operative, by detection of the holes in the tape, to disengage the clutch connecting the motor M to the screw and apply the brake. By employing a magnetic clutch and brake, the screw may be stopped so as to bring the head to a stop within a predetermined distance relative to the hole in the tape thus making it possible, by adjustment of the position of the first hole relative to the edge of the work, to determine just where the first cut will be made. The sensing means stops the head at intervals corresponding to the intervals between holes, effects the cutting stroke of the ram and then initiates the next step. There is sensing means for moving the head in each direction, that is, from left to right and from right to left, as seen in FIG. 1. Sequence switches 152, as will appear hereinafter, engaged by the head at each side of the platen, operate to withhold further travel following the last cutting operation and initiate feeding of the material forwardly on the work platen so as to present an uncut portion thereof for cutting. There is means in the form of a switch operative, at the termination of the forward feeding movement, to initiate a cutting stroke; to reverse the direction of movement of the head; and to commence its traverse in the reverse direction after the cut.

The sensing means are supported on the head by an elongate block 78 (FIG. 5) fastened to the front side of the head, so as to provide a forwardly projecting vertical surface. A bar 80 is secured in a horizontal position to the front face of the block 78 by bolts 82 and contains a horizontally disposed way 84 lengthwise thereof. A block 86 is secured to the right end of the bar 80 across the open end of the way 84 by bolts 88, so that it projects forwardly therefrom. A slide 90 is mounted in the way and slidably retained therein by a bar 92 at the left end secured by bolts 94 to the bar 80 across the open front of the way and at the right end by a block 96 secured by bolts 98 inserted through the bar 80 from the back side and screwed into the back side of the block 96. A block 100 is fastened to the slide by bolts inserted through the slide into the rear side thereof and provides bearing support for the left-hand end of a screw 110, the latter being rotatably mounted in the block 100 and secured therein by a collar 111 pinned to its extremity. The block 86 contains a hole 106. The screw 110 extends from the block 86 and has on it a knob 112 by means of which it may be rotated and, by such rotation, move the slide 90 lengthwise of the bar 80. A lock nut 108 is mounted on the screw 110 to lock the screw in its adjusted position.

The adjustment provided for by the slide 90 makes it possible to obtain alignment of cuts in successive rows in spite of differences in the feed characteristics of the screw or other factors influencing the feed in such fashion that it differs in one direction from that in the other direction. This is accomplished by rotating the screw 110 until the hole in the tape which initiates stopping has the same position relative to the moving head after stopping whether the head was moving to the right or to the left. This feature is important because it enables aligning the cuts in successive rows lengthwise of the work and eliminates errors which would run the cuts off the edge of the work if allowed to go uncorrected.

The sensing means for effecting movement from right to left is mounted on a block 114 which, in turn, is mounted on the slide 90, so as to be movable therewith by a pair of spaced, forwardly projecting pins 116 and 118 (FIG. 6), secured at their inner ends to the slide 90. Springs 120 are mounted on the pins 116 and 118 between the rear side of the block 114 and the bar 90, the forward ends of the springs being seated in recesses in the rear side of the block. A collar 122 is secured to the forwardly projecting end of the pin 116 and a knurled nut 124 is threaded onto the forward end of the pin 118. By rotating the nut the block may be forced rearwardly on the pins toward the bar 90 by compression of the springs 120 thus enabling adjustment of the block toward and from the bar 90. By adjustment of the block 114 forwardly, it may be brought into alignment with the row 74 which provides for half-stepping the head during the return traverse from right to left.

The sensing means for effecting movement from left to right is mounted on the block 96 which, as heretofore described, is fixed to the bar 80.

Each of the blocks 96 and 114 contains a horizontally disposed slot 128 (FIG. 5) situated at a level corresponding to the tape supported between the blocks 36 and 50, so that as the head moves transversely of the platen the blocks 96, 114 travel along the length of the tape. A movable tape guide 97 is secured to the block 96 over the slot to hold the tape in position and to allow easy removal of the tape.

The lower part of each block contains a vertically disposed hole 130 within which is mounted one component 132 of a photoelectric assembly. A conductor 134 connects the component 132 with a control 138. The upper half of each block contains a hole 140 within which is mounted the other component 142 of the photosensitive assembly. A conductor 144 connects the component 142 with the control 138. Apertures 146 and 148 extend from the holes 130 and 140 into the slots 128 so as to be in registration with each other and to permit passage of light from one component to the other through the tape each time a hole in the tape moves into registration with these apertures.

The control 138 embodies a circuit which, upon receiving signals from the sensing devices in either direction, operates to bring the head to a stop, lower the ram for cutting, raise it, and then step the head transversely until the next hole is intercepted. The circuit is designed so that on movement from left to right, one sensing device is operative and the other is not and for movement from right to left the other is operative and the one is not.

The adjustment of the block 114 widthwise of the tape enables control of the movement in one direction by one row of holes so that it is possible to half-step the cuts as related above. If desired, the block 114 and the sensing device supported thereby may be adjusted to a position out of alignment with the holes 72 in the tape so that the cutting is effected only in one direction.

The block 78 has secured to its upper side (FIG. 1) a cam bar 146 which is movable with the head and which has at each end an inclined cam surface 148. A bar 150 is fastened to the face of the beam above the cam bar and parallel thereto and has adjustably mounted thereon the sequence switches 152 referred to above and limit switches 154. The sequence switches 152 have pivoted arms 156 adapted to be engaged by the inclined ends 148 of the cam bar. When the cam engages one of the sequence switches it preconditions the control circuit so that at the end of the cutting operation, which follows the last stepping of the head during which stepping the sequence switch was actuated, the head will be prevented from taking the next step by declutching the motor M from the screw and applying the brake. Simultaneously the magnetic clutch connecting the motor drive for the feed rolls is applied to advance the work forwardly across the platen sufficiently to present an uncut portion thereof for cutting. Following material feeding movement through a predetermined distance as determined by a control which will be described hereinafter, a cutting stroke is initiated and when completed rotation of the motor M is reversed, the clutch re-engaged and the brake disengaged to effect stepping of the head transversely of the platen in the opposite direction. When the control circuit is set for half-stepping, completion of the material feed will cause stepping of the head a half-step after which cutting will take place. The sequence switches are individually adjustable on the bar 150 to enable controlling the number of steps of traverse of the ram. The limit switches are for the purpose of preventing overrun in either direction. Automatic cutting will continue until stopped by a counter provided for this purpose or by manual means.

The feed of the material is of course governed by the size of the cutting die being used and is controlled by a device 158 (FIGS. 4, 7 and 8) mounted at the rear side of the machine. The control 158 is provided with a dial 160 (FIGS. 7 and 8) graduated peripherally. The dial is fixed over the end of a forwardly projecting shaft 162 to the front of a box 163 (FIG. 8). The shaft 162 is rotatable relative to the dial within a hole centrally thereof. An arm 164 is keyed to the shaft and has at its distal end a clamp screw 166 threaded into a clamping block 170. A shoulder 171 extends from the clamping block behind the disc 160 and is operable, when drawn against the back side of the disc, to hold the arm locked in position. Frictional locking of the arm to the disc enables fine adjustment of the feed.

The shaft 162 extends rearwardly from the dial into the box and has fixed to it a disc 174a and a hub 162a. A shaft 202 journaled in the back of the box in alignment with the shaft 162 supports a magnetic clutch 200, the stator of which is non-rotatably fixed to the box by a bracket 201. The shaft 202 also supports a disc 174b which has on it a hub 178 corresponding in diameter to the hub 162a. A coiled spring 184 is mounted on the two hubs with its ends connected, respectively, to pins 186, 188, the latter, in turn, being fixed to the discs 174a and 174b. The discs have bracket arms 176a and 176b secured thereto which project rearwardly and forwardly, respectively, in underlapping relation, that is, the bracket arm 176a is situated beneath the bracket arm 176b. A screw 177 is threaded through the bracket arm 176a from the underside and provides a stop against which the bracket 176b rests and is held by the tension in the spring 184. The disc 174b has on it a cam 196 which is movable with the disc when the latter is rotated to operate the actuating arm 198 of a switch S1. The clutch 200 is operable, when energized during material feeding, to effect rotation of the disc 174b until the cam 196 engages the actuating arm of the switch S1, whereupon the clutch will be de-activated and the spring 184 will return the disc 174b to its initial position of engagement with the screw 177. The length of sheet material fed forwardly on the platen is thus controlled by the initial position of the disc 174a with reference to the switch-actuating arm 198.

The shaft 202 with which the clutch 200 is associated has a part 194 extending forwardly through the disc 174b which is supported within an axial bore 190 in the hub 178 and has on its rear end a gear 204. The gear 204 meshes with an idler 206 and the latter meshes with a gear 208 keyed to a shaft 210. The shaft 210 is connected by means of a suitable coupling 211 to the shaft which drives the feed discs 16. A motor (not shown) provides power for driving the drive shaft for the feed discs. To provide for accurate material feed a magnetic clutch and brake assembly (not shown) is employed for connecting the shaft to the motor for effecting rotation and for applying a brake to the shaft simultaneously with declutching to stop rotation promptly. The clutch is actuated each time a cutting stroke is completed following a stepping of the head during which a sequence switch 152 was actuated. Simultaneously, the magnetic clutch 200 is actuated to commence rotation of the disc 174b. Rotation of the feed discs and of the disc 174b will continue until the cam 196 engages the arm 198 of the switch S1, so as to de-activate both clutches. Depending on whether the control is set for full-step cutting or for half-step cutting, actuation of the switch S1 will either cause a cutting stroke or a stepping of the head. In the event that half-stepping is to be employed, the circuit provides for making a half-step prior to cutting.

The machine is prepared for operation by selecting a tape containing holes properly spaced for the kind of pieces which are to be cut from the sheet material and mounting it between the pins 48 and 68. The machine may now be operated in each direction to determine how far the head will travel before it comes to a stop after the sensing means intercepts a hole in the tape and is then adjusted so that the head will stop in the same position relative to the hole in the tape in each direction by adjustment of the screw 110. The position of the sheet material on the platen is now established and knowing the distance the die will travel following interception of the sensing means with the hole in the tape, the tape is shifted lengthwise by rotation of the nut 46 to so position the first hole at the left end of the tape that the die will make the first cut within a predetermined distance of the left edge of the work. The sequence switches are to establish the number of steps in each direction and the feed dial is adjusted to feed the sheet material forwardly the right amount.

It should be understood that the present disclosure is for the purpose of illustration only and that this invention includes all modifications and equivalents which fall within the scope of the appended claims.

We claim:

1. In an automatic die-cutting machine, a platen for supporting sheet material, a die, means supporting the die for movement transversely of the platen and for movement perpendicular to the platen into cutting engagement with the sheet material resting on the platen, drive means for effecting transverse movement of said means supporting the die step-by-step from one longitudinal edge of the material to the other, mutually cooperable means including a plurality of first means positioned at predetermined intervals transversely of the platen and second means movable with the support operable, in cooperation with each of said first means, to arrest operation of said drive means, and means for adjusting the relative positions of said mutually cooperable means to enable arresting movement of said drive means and hence of said means supporting the die in precisely the same position with respect to each of said first means each time its operation is effected by one of said first means.

2. In an automatic die-cutting machine, a platen for supporting sheet material, a die, a head supporting the die for movement transversely of the platen and for movement into cutting engagement with sheet material resting on the platen, motor driven means for effecting transverse movement of the head, a tape containing a plurality of spaced holes situated at predetermined intervals transversely of the platen, and sensing means moving with the head operative, in response to each hole in turn, to render the drive means inoperative and to stop the head, said sensing means being adjustable relative to said tape to enable rendering the driving means inoperative and bringing said head to a stop at precisely the same position relative to the hole initiating such response each time said sensing means is responsive to said hole.

3. Apparatus according to claim 2, comprising a support on the head on which the sensing means is mounted for movement lengthwise of the tape, said sensing means being adjustable on the support transversely of the tape to a position out of registration with the holes lengthwise of the tape.

4. Apparatus according to claim 2, comprising a bar slidably supported on the head for lengthwise movement parallel to the tape, said sensing means being movable with the bar lengthwise of the tape and adjustable toward and away from the bar transversely of the tape.

5. Apparatus according to claim 2, comprising a bar slidably mounted on the head, a screw operative to move the bar lengthwise relative to the head, spaced parallel pins fixed to the bar and projecting from its outer side, said sensing means being slidably mounted on the pins for movement toward and away from the face of the bar, spring means situated between the sensing means and the bar urging the sensing means outwardly away from the bar, and a nut threaded on one of the pins rotatable to hold the sensing means pressed against the bar in which position the sensing means is in registration with the holes in the tape.

6. Apparatus according to claim 2, comprising a first sensing device operative to step the head transversely of the platen from left to right and a second sensing device operative to step the head transversely of the platen from right to left.

7. Apparatus according to claim 2, comprising first and second sensing devices operative in response to the holes in the tape, and means at each end of the platen operative, by movement of the head into adjacency therewith, to render one of the sensing means inoperative and the other operative.

8. Apparatus according to claim 2, comprising first and second sensing devices supported in registration with parallel rows of holes in the tape, and means operative at each side of the platen, by movement of the head into adjacency therewith, to render one of the sensing devices inoperative and the other operative.

9. In an automatic die-cutting machine, a platen for supporting sheet material, a die, a head supporting the die for movement transversely of the platen and for movement into cutting engagement with sheet material resting on the platen, drive means for effecting transverse movement of the head, first means situated in spaced relation at a predetermined number of positions transversely of the platen, second means movable with the head operative, in response to said first means, to render the drive means inoperative at a corresponding number of positions, and means operative, in response to operation of said first and second means as the head moves toward each position to render said drive means inoperative and to bring the head to a stop at the same position relative to each one of said first means initiating such response each time said second means is responsive to said one of said first means.

10. In an automatic die-cutting machine, a platen for supporting sheet material, a die, a head supporting the die for movement transversely of the platen and for movement into cutting engagement with sheet material resting on the platen, drive means for effecting movement of the head, a tape containing a plurality of uniformly spaced holes, and sensing means movable with the head cooperable with each hole in turn to render the drive means inoperative to stop the head, and means for adjusting said sensing means relative to said holes to enable arresting the head in the same relative position to each hole each time it is arrested.

11. In an automatic die-cutting machine, a work-supporting platen, a die, a head supporting the die for movement transversely of the platen and for movement into cutting engagement with the work resting on the platen, drive means for effecting movement of the head transversely of the platen across and back, means containing a predetermined number of holes spaced transversely relative to the platen, and means operative, in conjunction with said holes, to render the drive means inoperative and to arrest the head in each direction of movement as many times as there are holes, said means embodying parts adjustable relative to each other to enable arresting the head in the same position relative to each of said holes in the tape whether the head is moving in one direction or the other.

12. In an automatic die-cutting machine, a work-supporting platen, a die, a head supporting the die for movement transversely thereof and for movement into cutting engagement with work resting on the platen, drive means for effecting movement of the head transversely of the platen across and back, a part containing a predetermined number of holes spaced transversely of the platen and sensing means including components independently cooperable with said holes to render the drive means inoperative in each direction to arrest the head at predetermined positions relative to the platen as many times as there are holes, one of said sensing means being adjustable relative to the other to enable arresting the head in the same position relative to each of said holes in said part whether the head is moving in one direction or the other.

13. In an automatic die-cutting machine, a work-supporting platen, a die, a head supporting the die for movement transversely thereof and for movement into cutting engagement with sheet material resting on the platen, means for effecting movement of the head, a tape containing holes spaced transversely of the platen, photoelectric sensing devices mounted on the head for movement therewith, one of said devices being operative in conjunction with the holes in said tape to stop the head in one direction and the other in the opposite direction, and means for effecting relative movement of one of the devices relative to the other to enable arresting the head in the same position relative to the hole in the tape initiating such stopping whether the head is moving in one direction or the other.

14. In an automatic die-cutting machine, a work-supporting platen, a die, a head supporting the die for movement transversely thereof and for movement into cutting engagement with the work resting on the platen, drive means for effecting movement of the head across and back, and means operative, when the head reaches a predetermined point in its transverse movement and following the cutting operation, to suspend further movement and initiate feeding of the work forwardly on the platen to present an uncut portion of the work for cutting, and means for thereafter initiating reverse movement of the head.

15. In an automatic die-cutting machine, a work-supporting platen, a die, a head supporting the die for movement transversely thereof and for movement into cutting engagement with the work resting on the platen, drive means for effecting movement of the head across and back, and means operative, when the head reaches a predetermined point in its transverse movement and following the cutting operation, to suspend further movement and initiate feeding of the work forwardly on the platen to present an uncut portion of the work for cutting, and means operative, following material feeding, to effect cutting followed by movement of the head in the reverse direction.

16. In an automatic die-cutting machine, a work-supporting platen, a die, a head supporting the die for movement transversely thereof and for movement into cutting engagement with work resting on the platen, means for effecting movement of the head transversely of the platen, and sequence switches at each side of the platen operative each time a cutting stroke is completed, following the stepping of the head during which the sequence switch was actuated, to suspend further movement in that direction and initiate feeding of the work forwardly on the platen, and means operative, at the termination of the forward feeding movement of the work, to reverse the traverse of the head.

17. In an automatic die-cutting machine, a work-supporting platen, a die, a head supporting the die for movement transversely thereof and for movement into cutting engagement with sheet material resting on the platen, means for effecting movement of the head, and sequence switches at each side of the platen operative each time a cutting stroke is completed, following a stepping of the head during which the sequence switch was actuated, to suspend further movement in that direction, and means supporting the sequence switches for adjustment transversely of the platen to control the length of transverse movement.

18. In a cutting machine, a platen, a beam supported in spaced parallel relation to the platen transversely of its width, a cutting head slidably mounted on the beam for movement transversely of the platen, a part carried by the head movable relative to the platen to perform a cutting operation on work resting on the platen, means for effecting movement of the head transversely of the platen, and means for controlling movement of the head in steps of predetermined length, comprising adjustable supports mounted on the frame at opposite sides of the platen substantially at the level of the beam to which the ends of a tape are secured, said tape containing indicia situated lengthwise thereof at intervals corresponding to the distance between the successive cuts to be made, means movable with the head operative, by the holes in the tape, to effect stepping at said intervals, and means associated with the supports operative to hold the tape taut, said means being further operative to adjust the tape bodily transversely of the platen to change the location at which cuts will be made relative to the work resting on the platen.

19. In a cutting machine, a platen, a beam supported in spaced parallel relation to the platen transversely of its width, a cutting head slidably mounted on the beam for movement transversely of the platen, a part carried by the head movable relatively to the platen to perform a cutting operation on the work resting on the platen, means for effecting movement of the head transversely of the platen, and means for controlling movement of the head in steps of predetermined length between cutting operations, comprising a tape mounted transversely of the platen containing holes situated at predetermined intervals lengthwise thereof, means movable with the head operable, in response to the presence of the holes in said tape, to effect stepping, adjustable supports mounted on the frame at opposite sides of the platen substantially at the level of the beam to which the ends of the tape are secured so as to extend transversely of the platen, said supports being slidable lengthwise, a spring operatively associated with one of the supports, urging the support in a direction to hold the tape in tension, and a screw and nut assembly operatively associated with the other support operative to adjust the tape bodily relative to the one support.

References Cited by the Examiner

UNITED STATES PATENTS

| 2,171,891 | 9/1939 | Rhodes | 83—399 |
| 2,479,293 | 8/1949 | Bayless | 77—5 |
| 2,757,560 | 8/1956 | Ridgway | 77—22 |
| 2,832,239 | 4/1958 | Bert et al. | 77—32.1 |
| 3,022,693 | 2/1962 | Voorhees | 83—217 X |
| 3,068,721 | 12/1962 | Ausenda et al. | 83—217 X |
| 3,169,434 | 2/1965 | Westerfield | 83—565 X |

ANDREW R. JUHASZ, *Primary Examiner.*

WILLIAM W. DYER, JR., *Examiner.*

L. B. TAYLOR, *Assistant Examiner.*